362-441 SR

OR RE 10,087

2 Sheets—Sheet 1.

C. VOTTI,

Assignor to B. B. SCHNEIDER.

SHADE HOLDER FOR LAMPS.

Re 10,087. Reissued Apr. 11, 1882.

Witnesses
T. J. Keane
E. Moran

Inventor
Carl Votti
By his atty
Edwin H. Brown.

N. PETERS, Photo-Lithographer, Washington, D. C.

2 Sheets—Sheet 2.

C. VOTTI,

Assignor to B. B. SCHNEIDER.

SHADE HOLDER FOR LAMPS.

No. 10,087. Reissued Apr. 11, 1882.

*WITNESSES*

Franck L. Durand

E. F. Walker

*INVENTOR,*

Carl Votti by Edwin H. Brown his Attorney.

N. PETERS, Photo-Lithographer, Washington, D. C.

UNITED STATES PATENT OFFICE.

CARL VOTTI, OF PHILADELPHIA, PENNSYLVANIA, ASSIGNOR TO B. B. SCHNEIDER, OF NEW YORK, N. Y.

SHADE-HOLDER FOR LAMPS.

SPECIFICATION forming part of Reissued Letters Patent No. 10,087, dated April 11, 1882.

Original No. 182,973, dated October 3, 1876; Reissue No. 7,511, dated February 13, 1877. Application for reissue filed March 11, 1882.

*To all whom it may concern:*

Be it known that I, CARL VOTTI, formerly of Newark, in the county of Essex and State of New Jersey, but now of Philadelphia, in the county of Philadelphia and State of Pennsylvania, have invented a new and useful Improvement in Lamps, which invention is fully set forth in the following specification, reference being had to the accompanying drawings, in which—

Figure 1:
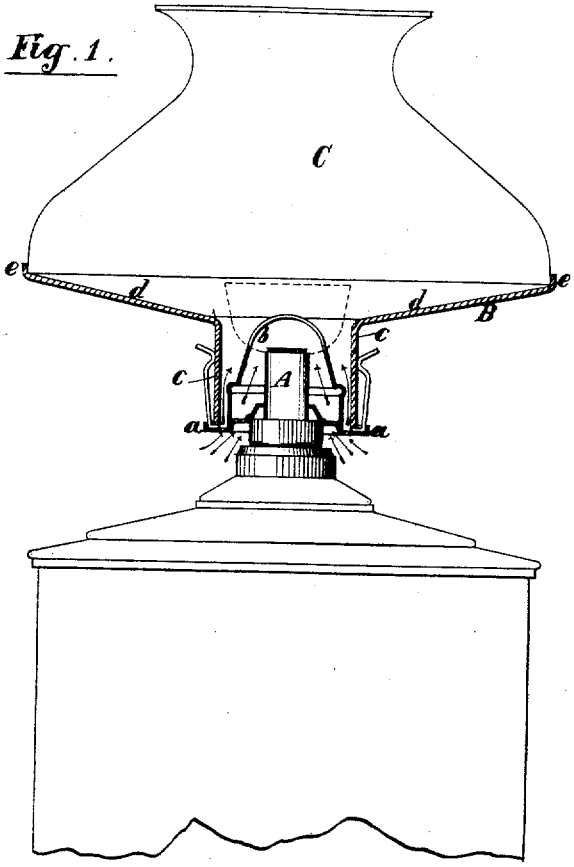
Figure 2:
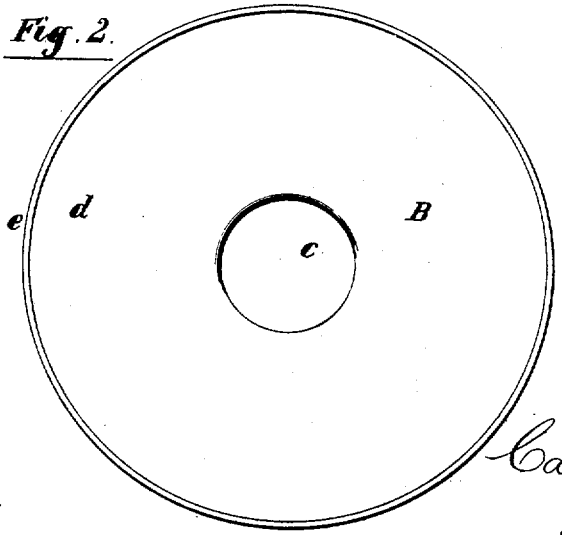
Figure 3:
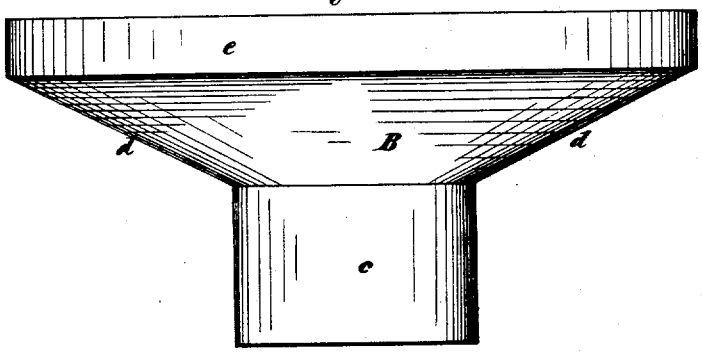

Figure 1 represents a vertical central section, Fig. 2 is a plan or top view, and Fig. 3 is a side view, of a shade-holder having the same relative form and proportions as the model which was filed in the Patent Office with my application for my original Letters Patent. Similar letters indicate corresponding parts.

My invention consists in so constructing a shade-holder and combining the same with a kerosene-burner and a shade whose general form is conical or conoidal that the shade and shade-holder together induce and direct a draft of air to the burner, while at the same time the shade retains the form and position with reference to the flame which enables it to perform the useful offices performed by a similar shade used outside of a chimney.

In the drawings, the letter A designates an ordinary flat-wick kerosene lamp-burner, which, when used, requires a device for inducing and directing a draft of air to it, and which is provided with a flange, *a*, for the support of the cone *b*. This flange ordinarily also serves to support the chimney or cylinder, and is furnished with holes through which air is admitted both inside and outside of the cone.

Instead of using the flange *a* for the support of the ordinary chimney, I place on the same my shade-holder B, which is made of glass or other transparent material, and which is provided with a tubular extension or socket, *c*, that fits over the cone *b*, leaving an air-space between its inner surface and the outer surface of said cone. From said socket extends a broad dish-shaped flange, *d*, which is provided with a rim, *e*, and which serves to support and retain the shade C. The flange *d* is perfectly closed, so that no air will pass to the flame except what is admitted through the perforations in the burner-flange *a*.

It will be observed that the shade C, which is to fit on the shade-holder, converges from its base toward its top, so as to be large at the base and considerably contracted at the top, whereby the upward-tending rays from the flame may be mostly intercepted by the shade and be reflected downward and outward around the fount of the lamp, while the equilibrium of the shade upon the shade-holder is such that no means of attachment other than the flange and rim of the shade-holder is needed to prevent its falling off in ordinary use.

It is well understood by persons skilled in the art that in constructing draft-inducing devices for kerosene-burners of the form described and shown a relationship admitting of considerable variation should be observed between the size of the opening at the top of the draft-inducing device, the height of the draft-inducing device, and the size of the burner used; and the necessities and possible variations of such relationship are well understood. In my draft-inducing device, the shade being large at its base and converging toward its top, its form admits of regulating the proper relationship in the parts referred to.

The shade-holder shown in Fig. 3 of the drawings filed herewith correspond in size, as well as in form and proportions, with the model which was filed with my application for my original Letters Patent. The form and proportions of this shade-holder are well adapted for use in carrying out my invention. Obviously the sizes of the shade-holders employed in carrying out the invention should be altered as the sizes of the burners with which they are used vary or are increased.

The advantages of this device will be apparent, since it embodies the advantages of a shade, allows of keeping the burner clean, of trimming the wick without difficulty, and the annoyance of broken chimneys is avoided.

I am well aware that transparent shade-holders are of themselves not new; hence I do not claim such, broadly, as being my inveniion.

What I claim as new, and desire to secure by Letters Patent, is—

1. In a lamp, the combination of a kerosene-burner with a transparent shade-holder and a shade, the shade-holder being adapted to rest upon the burner in the place adapted for the ordinary chimney, the shade resting on said shade-holder, and being formed so as to converge from its base toward its top, and the shade and shade-holder together constituting the draft-inducing device for the burner, substantially as set forth.

2. The shade-holder B, constructed of material that will admit of the passage of light, and provided with a downwardly-extending socket, *c*, and dish-shaped flange *d*, with rim *e*, in combination with a shade, C, converging from base to top, and the kerosene-burner A of a lamp, as and for the purpose set forth.

3. The combination, in a lamp, of the burner A, having perforated flange *a* and cone *b*, the shade-holder B and socket *c*, and a shade converging from base to top, substantially as and for the purpose herein set forth.

4. The combination of the shade C, shade-holder B, constructed of transparent material and provided with a downwardly-extending socket, *c*, and dish-shaped flange *d*, with the cone *b*, having a flange, *a*, provided with apertures for the admission of air to the outside and inside of the cone, the whole arranged to operate without a chimney, substantially as specified.

CARL VOTTI.

Witnesses:
W. F. HAPGOOD,
G. H. BOUTON.